US012749688B2

(12) United States Patent
Lee et al.

(10) Patent No.: US 12,749,688 B2
(45) Date of Patent: Sep. 29, 2026

(54) ELECTRODE ASSEMBLY FOR LITHIUM SECONDARY BATTERY, AND LITHIUM SECONDARY BATTERY COMPRISING SAME

(71) Applicant: SAMSUNG SDI CO., LTD., Yongin-si (KR)

(72) Inventors: Jinhee Lee, Yongin-si (KR); Junghyun Nam, Yongin-si (KR); Hyo-jung Song, Yongin-si (KR); Mihwa Yang, Yongin-si (KR); Hyejin Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 563 days.

(21) Appl. No.: 18/014,019

(22) PCT Filed: Feb. 21, 2022

(86) PCT No.: PCT/KR2022/002525
§ 371 (c)(1),
(2) Date: May 12, 2023

(87) PCT Pub. No.: WO2022/211278
PCT Pub. Date: Oct. 6, 2022

(65) Prior Publication Data

US 2023/0290958 A1 Sep. 14, 2023

(30) Foreign Application Priority Data

Mar. 30, 2021 (KR) ........................ 10-2021-0041315

(51) Int. Cl.
*H01M 4/62* (2006.01)
*H01M 10/052* (2010.01)

(52) U.S. Cl.
CPC ......... *H01M 4/628* (2013.01); *H01M 10/052* (2013.01)

(58) Field of Classification Search
CPC ............................ H01M 4/628; H01M 10/052
See application file for complete search history.

(56) References Cited

U.S. PATENT DOCUMENTS

2009/0155678 A1 6/2009 Less et al.
2013/0202944 A1 8/2013 Song et al.
(Continued)

FOREIGN PATENT DOCUMENTS

CN 110326152 A 10/2019
EP 2978047 A1 1/2016
(Continued)

OTHER PUBLICATIONS

International Search Report for corresponding Application No. PCT/KR2022/002525, dated Jun. 7, 2022, 6 pp.
(Continued)

*Primary Examiner* — Karie O'Neill Apicella
(74) *Attorney, Agent, or Firm* — Womble Bond Dickinson (US) LLP

(57) ABSTRACT

The present invention relates to an electrode assembly for a lithium secondary battery, and a lithium secondary battery comprising same, the electrode assembly comprising a current collector, an anode comprising an anode active material layer located on the current collector and a functional layer integrated with the anode active material layer; and a cathode, wherein the functional layer includes at least one inorganic layer and the peel strength of the functional layer is 0.2 N/m or greater.

14 Claims, 5 Drawing Sheets

1

(56) References Cited

U.S. PATENT DOCUMENTS

| | | | |
|---|---|---|---|
| 2013/0236766 | A1 | 9/2013 | Seo et al. |
| 2016/0043370 | A1 | 2/2016 | Hatta et al. |
| 2017/0222244 | A1 | 8/2017 | Kim et al. |
| 2019/0305279 | A1* | 10/2019 | Takamatsu ............ H01M 50/46 |
| 2019/0355952 | A1* | 11/2019 | Yoon ................. H01M 10/0525 |
| 2020/0119333 | A1 | 4/2020 | Masuzawa et al. |
| 2020/0185677 | A1 | 6/2020 | Kim et al. |
| 2021/0057702 | A1 | 2/2021 | Seok et al. |
| 2021/0098847 | A1 | 4/2021 | Jeong et al. |

FOREIGN PATENT DOCUMENTS

| | | | |
|---|---|---|---|
| JP | 2010-225809 | A | 10/2010 |
| JP | 2014-038851 | A | 2/2014 |
| JP | 2016-100240 | A | 5/2016 |
| KR | 10-2008-0010166 | A | 1/2008 |
| KR | 10-2010-0072532 | A | 7/2010 |
| KR | 10-2011-0115025 | A | 10/2011 |
| KR | 10-2013-0090724 | A | 8/2013 |
| KR | 10-1750327 | B1 | 6/2017 |
| KR | 10-2017-0103208 | A | 9/2017 |
| KR | 10-1841792 | B1 | 3/2018 |
| KR | 10-2018-0097036 | A | 8/2018 |
| KR | 10-2019-0108792 | A | 9/2019 |
| KR | 10-2017239 | B1 | 9/2019 |
| KR | 10-2019-0113912 | A | 10/2019 |
| KR | 10-2020-0036803 | A | 4/2020 |
| KR | 10-2020-0071622 | A | 6/2020 |
| KR | 10-2020-0107602 | A | 9/2020 |

OTHER PUBLICATIONS

Extended European Search Report issued in corresponding EP Application No. 21864597.6, dated May 19, 2025, 9 pages.

Extended European Search Report issued in corresponding EP Application No. 22781399.5, dated Jun. 24, 2025, 9 pages.

U.S. Office Action dated Jul. 8, 2025, issued in U.S. Appl. No. 18/003,976 (10 pages).

International Search Report for corresponding Application No. PCT/KR2021/011477, dated Dec. 6, 2021, 4 pp.

Written Opinion of the International Searching Authority for Application No. PCT/KR2021/011477, dated Dec. 6, 2021, 4 pages.

US Final Office Action dated Jun. 12, 2026, issued in U.S. Appl. No. 18/003,976 (8 pages).

* cited by examiner

ELECTRODE ASSEMBLY FOR LITHIUM SECONDARY BATTERY, AND LITHIUM SECONDARY BATTERY COMPRISING SAME

CROSS-REFERENCE TO RELATED APPLICATIONS

This application is a U.S. National Phase Patent Application of International Application Number PCT/KR2022/002525, filed on Feb. 21, 2022, which claims priority to Korean Patent Application Number 10-2021-0041315, filed on Mar. 30, 2021, the entire content of each of which is incorporated herein by reference.

TECHNICAL FIELD

It relates to an electrode assembly for a lithium secondary battery and a lithium secondary battery including the same.

BACKGROUND ART

Recently, the rapid supplement of electronic devices such as mobile phones, laptop computers, and electric vehicles using batteries require surprising increases in demand for secondary batteries with relatively high capacity and lighter weight. Particularly, a lithium secondary battery has recently drawn attention as a driving power source for portable devices, as it a has lighter weight and high energy density. Accordingly, researches for improving performances of lithium secondary battery are actively studied.

A lithium secondary battery includes a positive electrode and a negative electrode which may include an active material being capable of intercalating and deintercalating lithium ions, and an electrolyte, and generates electrical energy due to an oxidation and reduction reaction when lithium ions are intercalated and deintercalated into the positive electrode and the negative electrode.

As for a positive electrode active material of a lithium secondary battery, transition metal compounds such as lithium cobalt oxides, lithium nickel oxides, and lithium manganese oxides are mainly used. As the negative electrode active material, a crystalline carbonaceous material such as natural graphite or artificial graphite, or an amorphous carbonaceous material, is used.

TECHNICAL PROBLEM

One embodiment provides an electrode assembly for a lithium secondary battery exhibiting excellent rate-capability and cycle-life characteristics. Another embodiment provides a lithium secondary battery including the electrode assembly.

TECHNICAL SOLUTION

One embodiment provides an electrode assembly for a lithium secondary battery consisting of: an anode including a current collector; an anode active material layer positioned on the current collector; and a functional layer integrated with the anode active material layer; and a cathode, wherein the functional layer includes at least one inorganic layer and the peel strength of the functional layer is 0.2 N/m or greater.

The functional layer may have a peel strength of 0.2 N/m to 2.0 N/m.

The inorganic layer may be a dense layer.

The inorganic layer may have a thickness of 1 μm to 25 μm.

The inorganic layer may include an inorganic material selected from alumina ($Al_2O_3$), boehmite (aluminum oxide hydroxide), zirconia, titania ($TiO_2$), and silica ($SiO_2$), or combinations thereof.

The functional layer may further include at least one organic layer including a polymer. The organic layer may have a three-dimensional network structure.

When the functional layer further includes an organic layer, the organic layer may be positioned to contact the anode active material layer. In another embodiment, if the functional layer further includes an organic layer, the inorganic layer may be positioned to contact the anode active material layer.

The organic layer may include a polymer selected from polyethylene, polypropylene, polyester, polyamide, polyimide, polyamideimide, polyetherimide, polyacrylonitrile, polyvinylidene fluoride, polyvinyl chloride, polyvinylidene chloride, a polyethylene glycol derivative, a polyoxide, polyvinyl acetate, polystyrene, polyvinylpyrrolidone, a copolymer thereof, or a combination thereof.

The organic layer may have a thickness of 1 μm to 20 μm.

When the functional layer further includes an organic layer, a peel strength of the functional layer may be 0.2 N/m or greater, or 0.2 N/m to 2.0 N/m.

An interface between the anode active material layer and the functional layer may have a dense form.

According to another embodiment, a lithium secondary battery including the electrode assembly and an electrolyte, is provided.

ADVANTAGEOUS EFFECTS

An electrode assembly for a lithium secondary battery according to one embodiment may exhibit excellent rate-capability and cycle-life characteristics.

BEST MODE FOR PERFORMING INVENTION

Figure 1:
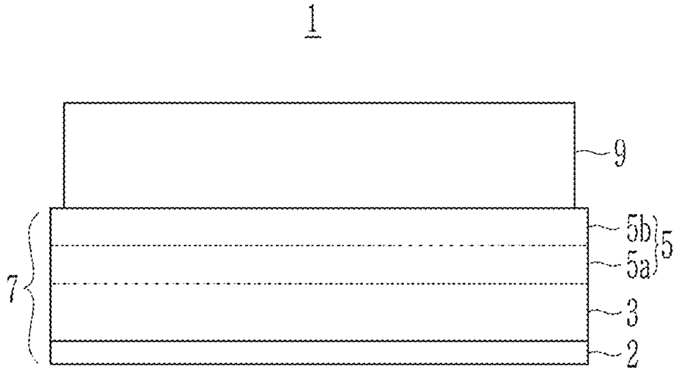
FIG. 1 is a drawing showing an electrode assembly for a lithium secondary battery according to one embodiment.

Hereinafter, embodiments are described in detail. However, these embodiments are examples, the present invention is not limited thereto, and the present invention is defined by the scope of claims.

An electrode assembly for a lithium secondary battery consists of an anode and a cathode, and the anode includes a current collector, an anode active material layer positioned on the current collector, and a functional layer integrated with the anode active material layer.

The functional layer is located between the cathode and the anode to act as a separator preventing short circuits, so that the electrode assembly for a lithium secondary battery does not include any additional separator.

As the electrode assembly for the lithium secondary battery according to one embodiment does not include an additional separator, a lamination process for combining a separator and an electrode may not be necessary, and thus, the battery may be economically fabricated.

Furthermore, integration of the functional layer with the anode active material layer does not indicate that the functional layer is separately formed from the anode active material layer. It relates to a state in which the anode active material and the functional layer are more firmly bonded, as the anode active material layer is partially immersed and dried by directly forming the functional layer on the anode active material layer. As such, integration of the functional layer with the anode active material layer may be clearly shown from the anode active material being distinguished from the functional layer, but the interface (boundary part) has unevenness (unflat), when the electrode assembly is measured by SEM or the like. Furthermore, as the anode active material layer is integrated with the functional layer, the anode active material layer and the functional are in close contact each other so that an interface between the functional layer and the anode active material layer may be formed in a dense form without pores.

As such, as the functional layer is integrated with the anode active material layer, it may be presented in a more firmly combined form with the anode active material layer. Furthermore, a polypropylene film which is used as a separator may cause size changes due to heat shrinkage as the repeated charge and discharge proceeds, thereby insufficiently separating the cathode and the anode to cause shortcomings such as a short circuit. However, the electrode assembly according to one embodiment does not cause the shortcomings such as heat-shrinkage, as the functional layer which acts as a separator is integrated with the anode active material layer.

In addition, as the functional layer is integrated with the anode active material layer, resistance may be reduced while improving heat resistance and insulation. If a functional layer and an anode active material layer are separately formed and then they are combined, without forming the functional layer integrated with the anode active material layer, resistance to transfer of lithium ions may be increased and an additional process for subsequently integrating may also be required.

Furthermore, the functional layer according to one embodiment may include at least one inorganic layer, and according to another embodiment, may further include at least one organic layer together with at least one inorganic layer. For example, the functional layer may include at least 2 inorganic layers, or 2 to 10 inorganic layers. As such, in case of including 2 or more inorganic layers, the density of the functional layer is increased, thereby enhancing safety such as dendrite suppression and the like. Furthermore, in addition to the inorganic layer, two or more organic layers, and according to one embodiment, 2 to 10 organic layers may be included. Inclusion of two or more organic layers may improve the flexibility of the electrode (or prevention of the separation of the electrode). In case of including two or more inorganic layers or two or more organic layers, each inorganic layer and organic layer may be formed to cross each other, or may be formed of inorganic layers or organic layers without crossing each other.

When the functional layer further includes the organic layer, the order of the organic layer and the inorganic layer may be that the organic layer may be positioned to contact the anode active material layer, or alternatively, the inorganic layer may be positioned to contact the anode active material layer.

In one embodiment, the functional layer may have a peel strength of 0.2 N/m or greater, or 0.2 N/m to 2.0 N/m. In another embodiment, in case of also positioning the inorganic layer to contact the anode active material layer, the peel strength of the functional layer may be 0.2 N/m or greater, or may be 0.2 N/m to 2.0 N/m. The peel strength of the functional layer within the range may indicate very firm adherence of the functional layer to the anode active material. In addition, when the functional layer has the peel strength within the range, excellent high rate-capability may be exhibited and surprisingly improved cycle-life characteristics may be exhibited.

An electrode assembly in which the functional layer includes the inorganic layer and the organic layer is schematically shown in FIG. 1. Such an electrode assembly 1, as shown in FIG. 1, may consist of an anode 7 and a cathode 9, and the anode 7 may include a current collector 2, an anode active material layer 3, and a functional layer 5. The functional layer 5 may include a first layer **5*a* and a second layer 5*b*, and when the first layer 5*a* is an organic layer, the second layer 5*b* is an inorganic layer, and alternatively, when the first layer 5*a* is an inorganic layer, the second layer 5*b*** is an organic layer.

FIG. 1 shows that the anode active material layer 3 and the functional layer 5 are separated layers, but it merely distinguishingly shows the anode active material layer and the functional layer, and dotted lines indicate that the anode active material layer and the functional layer are integrated. Furthermore, as the first layer and the second layer are permeated with each other to form a functional layer, this is also indicated by a dotted line.

As the anode active material layer is integrated with the functional layer in the electrode assembly according to one embodiment, the size of the anode active material may be substantially identical to the functional layer in a width direction.

The inorganic layer may be presented as a dense layer, and such an inorganic layer may be prepared by, e.g., electrospraying. However, the inorganic layer preparation is not limited to the electrospraying, and may be any procedures such as doctor blade coating and the like, as long as the inorganic layer may be prepared as a dense layer. When the inorganic layer is presented as the dense layer, the generation of Li dendrites may be effectively suppressed. If the inorganic layer is presented as a porous layer, the short circuit may occur during charge and discharge.

The inorganic layer may have a thickness of 1 μm to 25 μm, or 10 μm to 14 μm. When the functional layer only includes the inorganic layer, the thickness of the inorganic layer refers to a thickness of the functional layer. In addition, in the specification, the thickness of the inorganic layer indicates a thickness of a region in which inorganic material is presented in the functional layer integrated with the anode active material layer, and does not indicate thickness of a region in which the inorganic material is only independently and separately presented. The thickness of the inorganic layer within the range renders to improve the density of the inorganic layer, thereby slightly suppressing the generation of Li dendrites.

The inorganic layer may include an inorganic material selected from alumina ($Al_2O_3$), boehmite (aluminum oxide hydroxide), zirconia, titania ($TiO_2$), and silica ($SiO_2$), or combinations thereof.

The organic layer may include a polymer, and may include, particularly, a heat resistant polymer. The heat resistant polymer may be a highly heat resistant engineering resin. Examples of the heat resistant polymer may be a polymer selected from polyethylene (PE), polypropylene (PP), polyester, polyamide, polyimide(PI), polyamideimide (PAI), polyetherimide, polyacrylonitrile (PAN), polyvinylidene fluoride (PVDF), polyvinylidene fluoride-hexafluoro propylene (PVDF-HFP), polycarbonate (PC), polyvinyl chloride (PVC), polyvinylidene chloride, an polyethylene glycol derivative, polyoxide, polyvinyl acetate, polystyrene (PS), polyvinyl pyrrolidone (PVP), a copolymer thereof, or combinations thereof. The heat resistant polymer may be a non-aqueous polymer, and if an aqueous polymer is used, it is not desirable as it is difficult to form fiber by electrospinning.

In one embodiment, the thickness of the organic layer may be 1 μm to 20 μm or 5 μm to 10 μm. In the specification, the thickness of the organic layer refers to a region in which organic material is presented in the functional layer integrated with the anode active material layer, and does not refer to a thickness of a region in which the organic material is separately presented. When the thickness of the organic layer satisfies the above range of thickness, a suitable high density may be obtained, and thus, generation of Li dendrites during charge and discharge may be effectively prevented.

Such an organic layer may have a three-dimensional network structure, for example, a woven structure, or non-woven structure, and the organic layer with the three-dimensional network structure may be prepared by e.g., electrospinning. However, the organic layer preparation is not limited to the electrospinning, and may be any general procedures, as long as an organic layer with a three-dimensional network structure may be prepared. As such, when the organic layer has the three-dimensional structure, for example, the woven structure or a non-woven structure, it has a merit that it may minimize resistance for transferring Li ions. The organic layer has the three-dimensional structure which indicates a porous layer in which pores are formed. If the organic layer is prepared as a dense layer, a distance for transferring Li ions is increased to relatively increase Li ion transferring resistance. Furthermore, it may be separated from the active material layer and it is not integrated with the active material layer.

The functional layer includes both the organic layer and the inorganic layer, and thus, a heat resistance effect and flexibility owing to inclusion of a polymer, particularly a heat resistant polymer, may be imparted to an anode, and therefore the shortcomings in which the anode may be damaged may be suppressed during the battery fabrication. In addition, the generation of lithium dendrites may be effectively suppressed during charge and discharge, and the increases in heat resistance and mechanical strength owing an inclusion of an inorganic material may be more enhanced. Such effects are difficult to obtain from one layer which is prepared by mixing the polymer and the inorganic material.

In case of only including an organic layer, particularly, an organic layer having a three-dimensional network structure, as a functional layer, Li dendrites may be generated or the cathode may directly contact the anode during the charge and discharge. Thus, a short-circuit may occur, and battery driving may be impossible. In case of only including an organic layer, even though the organic layer is formed with a 2-layer structure, similar problems to the above may be caused.

When the functional layer includes the organic layer as well as the inorganic layer, and the organic layer is firstly formed, the organic layer is prepared by electrospinning to have a three-dimensional structure, and thus the formation of the inorganic layer on the organic layer by electrospraying causing immersion of the composition for preparing the inorganic layer into the inside of the organic layer. Thus, the functional layer including both the organic layer and the inorganic layer may be all integrated with the anode active material layer. Furthermore, in case of firstly preparing the inorganic layer, the composition for preparing the organic layer may be partly immersed into the inorganic layer to form a functional layer including both the inorganic layer and the organic layer, thereby integrating it with the anode active material layer.

In one embodiment, the anode active material included in the anode active material layer may be a carbon-based active material, a silicon-based active material, or combinations thereof.

The carbon-based active material may be crystalline carbon, amorphous carbon, or a mixture thereof. The crystalline carbon may be graphite such as an unspecified shaped, sheet-shaped, flake shaped, spherical or fiber shaped natural graphite or artificial graphite, and the amorphous carbon may be soft carbon, hard carbon, mesophase pitch carbide, sintered cokes, and the like.

The Si-based active material may be Si, a Si—C composite, $SiO_x$ ($0<x<2$), and an Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, but not Si), and the Sn-based negative electrode active material is selected from Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, but not Si), and the like, and also, a mixture of at least one thereof with $SiO_2$. The elements Q and R may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof.

The anode active material layer may include the anode active material, and optionally, may further include a binder and a conductive material.

The amount of the anode active material may be 95 wt % to 99 wt % based on the total weight of the anode active material layer.

The amount of the binder may be 1 wt % to 5 wt % based on the total weight of the anode active material layer. When the conductive material is further included, 90 wt % to 98 wt % of the anode active material, 1 wt % to 5 wt % of the binder, and 1 wt % to 5 wt % of the conductive material may be included.

The binder improves binding properties of anode active material particles with one another and with a current collector. The binder may be a non-aqueous binder, an aqueous binder, or a combination thereof.

The non-aqueous binder may be an ethylene propylene copolymer, polyacrylonitrile, polystyrene, polyvinylchloride, carboxylated polyvinyl chloride, polyvinyl fluoride, polyurethane, polytetrafluoroethylene, polyvinylidene fluoride, polyethylene, polypropylene, polyamideimide, polyimide, or combinations thereof.

The aqueous binder may be a styrene-butadiene rubber (SBR), an acrylated styrene-butadiene rubber (ABR), an acrylonitrile-butadiene rubber, an acrylic rubber, a butyl rubber, a fluorine rubber, an ethylene oxide-containing polymer, polyvinylpyrrolidone, polypropylene, polyepichlorohydrin, polyphosphazene, an ethylene propylene diene copolymer, polyvinyl pyridine, chlorosulfonated polyethylene, latex, a polyester resin, an acrylic resin, a phenolic resin, an epoxy resin, polyvinyl alcohol, or combinations thereof.

When the aqueous binder is used as a negative electrode binder, a cellulose-based compound may be further used to provide viscosity as a thickener. The cellulose-based compound includes one or more of carboxymethyl cellulose, hydroxypropyl methyl cellulose, methyl cellulose, or alkali metal salts thereof. The alkali metal may be Na, K, or Li. The thickener may be included in an amount of 0.1 parts by weight to 3 parts by weight based on 100 parts by weight of the anode active material.

The conductive material is included to provide electrode conductivity, and any electrically conductive material may be used as a conductive material unless it causes a chemical change. Examples of the conductive material may be a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

The electrode assembly may be prepared by the following procedure.

An anode active material layer is formed on a current collector. The anode active material layer may be prepared by a general technique including mixing an anode active material, a binder, and optionally a conductive material in a solvent to prepare an anode active material composition of a slurry type, coating it on a current collector, and drying it.

Thereafter, a functional layer is formed on the anode active material layer to prepare an anode in which the anode active material layer is integrated with the functional layer. The functional layer may include at least one inorganic layer, or may further include at least one organic layer, together with the inorganic layer. The inorganic layer may be formed by using a composition for preparing an inorganic layer. The inorganic layer preparation may be performed by electrospraying, but the inorganic layer preparation is not limited thereto, and may be any procedures such as doctor blade coating and the like, as long as the inorganic layer may be prepared as a dense layer. In one embodiment, the inorganic layer preparation by electrospraying renders to readily volatize, and thus the spring back phenomenon in which the solvent damages the anode may be effectively suppressed. Hereinafter, the inorganic layer preparation by electrospraying will be illustrated.

An inorganic layer may be formed by electrospraying a composition for preparing the inorganic layer on a target substrate. The composition for preparing the inorganic layer includes an inorganic material, a binder, and a solvent.

The electrospraying may be performed by positioning one nozzle pack including a tip in which a hole size may be 23 G (gauge) to 30 G, and a collector roller at a predetermined gap, adding the composition for preparing the inorganic layer to the tip, positioning the target substrate on the collector roller, and applying a voltage of 35 kV to 50 kV to the tip.

The number of tips may be suitably controlled according to the amount, types, etc., of the polymer included in the composition for preparing the inorganic layer, and for example, may be 20 tips to 60 tips.

The predetermined gap between the nozzle pack and the target substrate may be 10 cm to 20 cm.

If the hole size of the tip is 25 G to 30 G, it is desirable because the organic layer of the desired type may be obtained.

According to the electrospraying, the composition for preparing the inorganic layer is sprayed as a dot type on the target substrate to prepare an inorganic layer. As such, according to the electrospraying the composition for preparing the inorganic layer, the composition for preparing the inorganic layer is immersed into pores which may be naturally formed in the anode active material layer to integrate the functional layer with the anode active material layer.

Furthermore, the roll speed of the collector roller may be adjusted in order to prepare an inorganic layer with the suitable thickness, and for example, may be 0.5 m/min to 3.0 m/min. In addition, the speed may be controlled in order to emit a solid content at a speed of 20 μl/min to 100 μl/min in the composition for preparing the inorganic layer discharged from the tip.

Furthermore, tip air may be suitably controlled by minimizing interference between tips to produce uniform electrospraying. The control for the tip air may be adjusted by flowing compressed air with a pressure of 0.1 MPa to 0.2 MPa.

After the electrospraying is performed, drying may be performed using hot air of 90° C. to 110° C.

In case of including at least one, for example, at least two inorganic layers as a functional layer, the electrospraying may be performed two or more times.

In the composition for preparing the inorganic layer, the inorganic material may be the same as the above polymers and the solvent may be dimethyl acetate, N-methyl pyrrolidone, dimethylformamide, acetone, or a combination thereof. The binder may be polyvinylidene fluoride, polyamide imide, polyvinylpyrrolidone, polyacrylonitrile, a copolymer thereof, or a combination thereof. An amount of the inorganic material in the composition for preparing the inorganic layer may be 85 wt % to 96 wt % based on the total weight, 100 wt %, of the composition. In the composition for preparing the the inorganic layer, an amount of the binder may be 0.5 wt % to 20 wt % based on the total weight, 100 wt %, of the composition.

When the functional layer further includes the organic layer, regardless of order of preparing the organic layer or the inorganic layer, the organic layer may be formed by electrospinning a composition for preparing an organic layer on a target substrate. The composition for preparing the organic layer may include a polymer and a solvent.

The electrospinning may be performed by positioning one nozzle pack including a tip in which a hole size may be 23 G (gauge) to 30 G, and a collector roller at a predetermined gap, adding the composition for preparing the organic layer to the tip, positioning the target substrate on the collector roller, and applying a voltage of 35 kV to 50 kV to the tip. The number of tips may be suitably controlled according to the amount, types, etc., of the polymer included in the composition for preparing the organic layer, and for example, may be 20 tips to 60 tips.

The predetermined gap between the nozzle pack and the target substrate may be 10 cm to 20 cm.

If the hole size of the tip is 25 G to 30 G, it is desirable because the organic layer of the desired type may be obtained.

According to the electrospinning, the polymer solution is sprayed and stretched in the form of fibers to be spun on the substrate in a form of a cone, thereby obtaining an organic layer. When it is illustrated in more detail, the composition for preparing the organic layer hangs at the tip end in the form of drops due to surface tension, and applying of a voltage generates a repulsive force of the electric charges. Accordingly, it starts distortion in the opposite direction to the surface tension, and when a critical voltage is reached, the polymer solution is sprayed from the end point of the droplet and the collector roller collects a spraying material called a Taylor cone to prepare an organic layer.

Herein, the electrospinning may be performed under a condition of 20° C. to 30° C. and relative humidity of 40% to 60%. When the electrospinning is performed under a condition of the temperature and the relative humidity, the spinning may be performed while the thickness of fibers may be uniformly maintained.

Furthermore, the roll speed of the collector roller may be adjusted in order to prepare an organic layer with the suitable thickness, and for example, may be 1 m/min to 3 m/min. In addition, the speed may be controlled in order to emit a solid content at a speed of 20 μl/min to 200 μl/min in the composition for preparing the organic layer discharged from the tip.

Furthermore, tip air may be suitably controlled by minimizing interference between tips to produce uniform electrospinning. The control for the tip air may be adjusted by flowing compressed air with a pressure of 0.1 MPa to 0.2 MPa.

After the electrospinning is performed, drying may be performed using hot air of 70° C. to 110° C.

In case of including at least one, for example, at least two organic layers as a functional layer, the electrospinning may be performed two or more times.

In the composition for preparing the organic layer, the polymer may be one or a mixture of at least one selected from the above polymers, and the solvent may be dimethyl acetate, dimethylformamide, acetone, or a combination thereof.

As the polymer may be the heat resistant polymer and the heat resistant polymer is non-aqueous, the solvent may be the organic solvent. A use of an aqueous polymer requires use of a water solvent which causes difficulty in electrospinning and damage to the electrode, that is, causes spring back. However, the embodiment uses organic solvents and thus the shortcomings caused from the use of a water solvent may not occur.

In the composition for preparing the organic layer, the amount of the polymer may be 5 wt % to 20 wt % based on the total weight, 100 wt %, of the composition. When the amount of the polymer is within the range, the organic layer with a suitable thickness may be prepared. If the amount of the polymer is less than 5 wt %, it is difficult to form fiber during the electrospinning, whereas a larger amount than 20 wt % causes the tip to block during the electrospinning and thus the spinning is impossible, or the thickness of the fibers is non-uniform and thicker than desired.

The organic layer is formed by electrospinning, and thus the resulting organic layer may have a three-dimensional network structure. If the organic layer is prepared by directly coating the composition on the substrate or dipping the substrate in the composition rather than electrospinning, the organic layer may be densely prepared. In addition, the thickness of the electrode may be extremely increased due to the solvent remaining in the electrode to not suitably improve energy density per volume of the battery. Furthermore, the dense organic layer itself acts as a resistance layer to increase Li ion transportation resistance, and thus the battery performances may be deteriorated.

According to one embodiment, if the organic layer is prepared by electrospinning, the solvent may be well volatilized, and the spring back phenomenon in which the solvent damages the anode may be effectively suppressed.

After the functional layer is prepared, roll pressing may be further performed. The roll pressing may be performed at 25° C. to 110° C. When the roll pressing is further performed, the functional composite layer is compressed to shorten a path for transferring Li ions, thereby obtaining advantages related to transferring lithium ions during charge and discharge.

When the functional layer includes both the inorganic layer and the organic layer, if the organic layer is firstly prepared, the electrospinning of the composition for preparing the organic layer is immersed into pores which may be naturally formed in the anode active material layer and integrated. Furthermore, the organic layer preparation by electrospinning makes a three-dimensional network structure, for example, a woven structure or a non-woven structure, and thus, the composition for preparing the inorganic layer is immersed into pores which may be naturally formed in the anode active material layer, thereby forming a functional layer and integrating it with the anode active material layer.

Furthermore, in case of firstly preparing the inorganic layer, the composition for preparing the inorganic layer may be immersed in pores which may be naturally formed to integrate therewith, and the composition for preparing the organic layer then undergoes electrospinning to slightly immerse it in the inorganic layer, thereby integrating the functional layer and the anode active material layer.

Such integration may be effectively obtained by further performing roll-pressing.

Thereafter, the anode may be positioned to be contacted with the cathode to prepare an electrode assembly. Herein, the cathode may be positioned in contact with the anode with the functional layer interposed therebetween.

The positive electrode may include a current collector and a positive electrode active material layer formed on the current collector.

The positive electrode active material may include lithiated intercalation compounds that reversibly intercalate and deintercalate lithium ions.

Specifically, one or more composite oxides of a metal selected from cobalt, manganese, nickel, and a combination thereof, and lithium, may be used. More specifically, the compounds represented by one of the following chemical formulae may be used. $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}CO_bX_cD_a$ (0.90≤a≤1.8, 0≤b≤0.5, 0≤c≤0.5, 0≤α≤2); $Li_aNi_{1-b-c}Co_bX_cO_{2-\alpha}T_\alpha$(0.90≤a≤1.8, 0≤b≤0.5, 0≤c≤0.05, 0≤α≤2); $Li_aNi_{1-b-c}Co_bX_cO_{2-\alpha}T_2$ (0.90≤a≤1.8, 0≤b≤0.5, 0≤c≤0.05, 0≤α≤2); $Li_aNi_{1-b-c}Mn_bX_cD_\alpha$ (0.90≤a≤1.8, 0≤b≤0.5, 0≤c≤0.05, 0≤α≤2); $Li_aNi_{1-b-c}Mn_bX_cO_{2-a}T_a$ (0.90≤a≤1.8, 0≤b≤0.5, 0≤c≤0.05, 0≤α≤2); $Li_aNi_{1-b-c}Mn_bX_cO_{2-\alpha}T_2$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0 \leq e \leq 0.1$); $Li_aNi_bCo_cAl_dG_eO_2G$ ($0.90 \leq a \leq 1.8$, $0 \leq a \leq b \leq 0.9$, $c \leq 0.5 \leq d \leq 0.5$, $0 \leq e \leq 0.1$); $Li_aNi_b$-$Co_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_a$-$CoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 51.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2\ PO_{43}$ ($0 \leq f \leq 2$); $Li_{(3-f)}OFe_2PO_{43}$ ($0 \leq f \leq 2$); $Li_aFePO_4$ ($0.90 \leq a \leq 1.8$)

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in any method having no adverse influence on properties of a positive electrode active material by using these elements in the compound (for example, the method may include any coating method such as spray coating, dipping, and the like), but is not illustrated in more detail since it is well-known in the related field.

In the positive electrode, an amount of the positive electrode active material may be 90 wt % to 98 wt % based on the total weight of the positive electrode active material layer.

In an embodiment, the positive electrode active material layer may further include a binder and a conductive material. Herein, the binder and the conductive material may be included in an amount of 1 wt % to 5 wt %, respectively, based on the total amount of the positive electrode active material layer.

The binder improves binding properties of positive electrode active material particles with one another and with a current collector. Examples thereof may be polyvinyl alcohol, carboxymethyl cellulose, hydroxypropyl cellulose, diacetyl cellulose, polyvinylchloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, a styrene butadiene rubber, an acrylated styrene.

The conductive material is included to provide electrode conductivity, and any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may use Al, but is not limited thereto.

A lithium secondary battery according to one embodiment may include the electrode assembly and an electrolyte.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethyl acetate, methyl propionate, ethyl propionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. In addition, the ketone-based solvent may include cyclohexanone and the like. Furthermore, the alcohol-based solvent may include ethyl alcohol, isopropyl alcohol, and the like, and examples of the aprotic solvent include nitriles such as R-CN (where R is a C2 to C20 linear, branched, or cyclic hydrocarbon, or may include a double bond, an aromatic ring, or an ether bond), amides such as dimethylformamide, dioxolanes such as 1,3-dioxolane, sulfolanes, and the like.

The organic solvent may be used alone or in a mixture, and when the organic solvent is used in a mixture, the mixture ratio may be controlled in accordance with a desirable battery performance.

Furthermore, the carbonate-based solvent may include a mixture with a cyclic carbonate and a linear carbonate. Herein, when the mixture of cyclic carbonate and linear carbonate mixed together in a volume ratio of about 1:1 to about 1:9 is used as an electrolyte, it may have enhanced performance.

The organic solvent may further include an aromatic hydrocarbon-based solvent as well as the carbonate-based solvent. Herein, the carbonate-based solvent and the aromatic hydrocarbon-based solvent may be mixed together in a volume ratio of 1:1 to 30:1.

The aromatic hydrocarbon-based organic solvent may be an aromatic hydrocarbon-based compound represented by Chemical Formula 1.

[Chemical Formula 1]

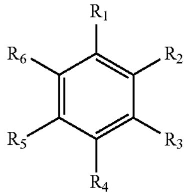

(In Chemical Formula 1, $R_1$ to $R_6$ are the same or different and are selected from hydrogen, a halogen, a C1 to C10 alkyl group, a haloalkyl group, and a combination thereof.)

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate, or an ethylene carbonate-based compound represented by Chemical Formula 2, as an additive for improving cycle life.

[Chemical Formula 2]

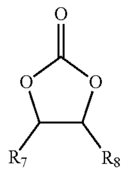

(In Chemical Formula 2, $R_7$ and $R_8$ are the same or different and may each independently be hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.)

Examples of the ethylene carbonate-based compound may include difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. In case of further using the additive for improving cycle life, an amount of the additive may be suitably controlled within an appropriate range.

The lithium salt dissolved in an organic solvent supplies a battery with lithium ions, basically operates the lithium secondary battery, and improves transportation of the lithium ions between positive and negative electrodes. Examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4FsSO_3$, $LiClO_4$, $LiAlO_2$, $LiAlCl_4$, $LiPO_2F_2$, $LiN(C_xF_{2x+1}SO_2)(CyF_{2y+1}SO_2)$, where x and y are a natural numbers, for example integers of 1 to 20, lithium difluoro (bisoxolato) phosphate, LiCl, LiI, $LiB(C_2O_4)_2$ (lithium bis (oxalato) borate: LiBOB) and lithium difluoro(oxalato)borate, LiDFOB). A concentration of the lithium salt may range from 0.1 M to 2.0 M. When the lithium salt is included at the above concentration range, an electrolyte may have excellent performance and lithium ion mobility due to optimal electrolyte conductivity and viscosity.

The lithium secondary battery may further include a separator between the negative electrode and the positive electrode, depending on a kind of the battery. Examples of a suitable separator material may include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
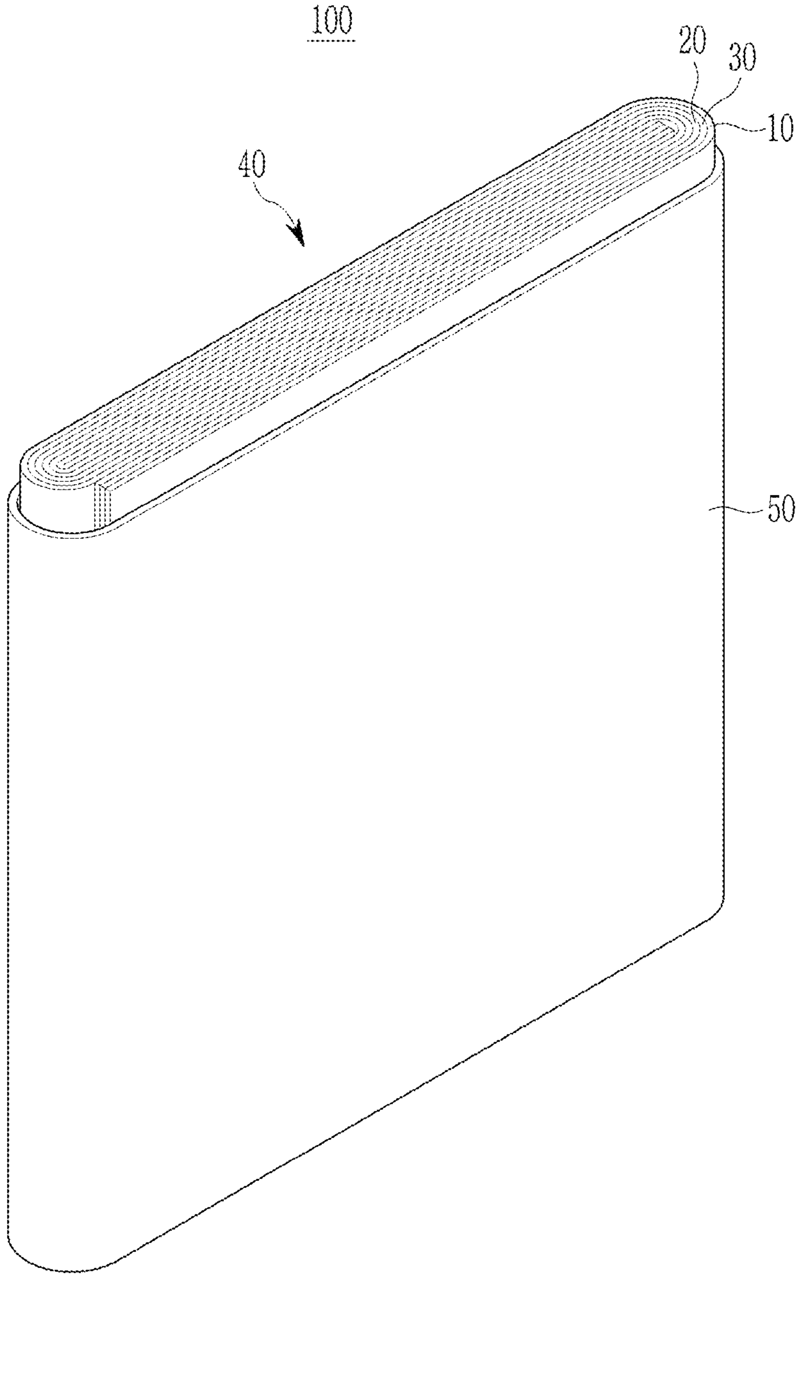
FIG. 2 is a schematic view showing the structure of a lithium secondary battery according to an embodiment.

FIG. 2 is an exploded perspective view of a lithium secondary battery according to one embodiment. The lithium secondary battery according to an embodiment is illustrated as a prismatic battery but is not limited thereto and may include variously-shaped batteries such as a cylindrical battery, a pouch battery, and the like.

Referring to FIG. 2, a lithium secondary battery 100 according to an embodiment includes an electrode assembly 40 manufactured by winding a separator 30 interposed between a positive electrode 10 and a negative electrode 20, and a case 50 housing the electrode assembly 40. An electrolyte (not shown) may be impregnated in the positive electrode 10, the negative electrode 20, and the separator 30.

MODE FOR PERFORMING THE INVENTION

Hereinafter, examples of the present invention and comparative examples are described. These examples are not in any sense to be interpreted as limiting the scope of the invention.

Example 1

97.5 wt % of artificial graphite, 1.0 wt % of carboxymethyl cellulose, and 1.5 wt % of styrene butadiene rubber (SBR) were mixed in a water solvent to prepare an anode active material slurry. The anode active material slurry was coated on a copper current collector and dried followed by pressurizing to prepare an anode active material layer.

A composition for an inorganic layer including alumina, a polyvinylidene fluoride binder, and a mixed solvent of dimethyl acetate and acetone (1:1 volume ratio) was electrosprayed on the anode active material layer to prepare an inorganic layer which was a dense layer. In composition for an inorganic layer, an amount of alumina was set to be 90 wt % based on the total, 100 wt %, of the composition for the inorganic layer and the amount of the polyvinylidene fluoride binder was set to be 10 wt %.

The electrospraying was performed according to the following method.

A collector roller and one nozzle pack including 52 tips in which a hole size was 25 G were positioned at a gap of 15 cm, the composition for the inorganic layer was added to the tip, a voltage of 40 kV to 50 kV was applied, and electrospinning was performed under a condition of 26° C. and relative humidity of 50%. Herein, the speed of a roll of the collector roll was set to be 1 m/min to 3 m/min, and the solid amount in the composition for the inorganic layer emitted from the tip was set to be 10 μl/min. Furthermore, while compressed air was flowed under a 0.1 MPa pressure, the process was performed.

After completing the electrospinning, drying was performed using hot air of 90° C.

According to the electrospraying, an inorganic layer with a thickness of 12 μm was formed.

According to the process, an anode in which the functional layer of the inorganic layer was integrated with the anode active material layer was prepared. 96 wt % of $LiCoO_2$, 2 wt % of ketjen black, and 2 wt % of polyvinylidene fluoride were mixed in an N-methyl pyrrolidone solvent to prepare a cathode active material slurry. The cathode active material slurry was coated on an Al current collector, dried, and compressed to prepare a cathode.

The anode and the cathode were stacked in contact with each other to fabricate an electrode assembly. Herein, the functional layer of the anode was positioned to be contacted with the cathode. A lithium secondary cell was fabricated by using the electrode assembly and an electrolyte. The electrolyte was prepared by using a mixed solvent of ethylene carbonate and ethyl methyl carbonate (a volume ratio of 50:50) and dissolving 1 M $LiPF_6$ therein.

Example 2

An anode active material layer was prepared in the same procedure as in Example 1 using the same anode active material slurry.

A composition for an organic layer including polyamide imide as a high heat resistant engineering resin and a dimethyl acetate solvent was electrospun on the anode active material layer to form an organic layer with a three-dimensional network structure. In the composition for an organic layer, an amount of polyamide imide was 10 wt % based on the total of 100 wt % of the composition for the organic layer.

The electrospinning was performed by the following method.

A collector roller and one nozzle pack including 52 tips in which a hole size was 25 G were positioned at a gap of 15 cm, the composition for the organic layer was added to the tip, a voltage of 40 kV to 50 kV was applied, and electrospinning was performed under a condition of 26° C. and relative humidity of 50%. Herein, the speed of a roll of the collector roll was set to be 1 m/min to 3 m/min, and the solid amount in the composition for the organic layer emitted from tip was set to be 150 μl/min. Furthermore, while compressed air was flowed under a 0.1 MPa pressure, the process was performed.

After completing the electrospinning, drying was performed using hot air of 90° C.

According to the electrospinning, an organic layer with a thickness of 8 μm and having a three-dimensional network structure, was formed.

Thereafter, a composition for an inorganic layer prepared in Example 1 was electrosprayed on the organic layer as the same procedure as in Example 1 to form an inorganic layer which was a dense layer, with a thickness of 12 μm.

According to the process, an anode in which the functional layer of the organic layer and the inorganic layer was integrated with the anode active material layer and the interface between the anode active material layer and the functional layer was dense, was prepared.

A cathode was prepared by the same procedure as in Example 1.

The anode and the cathode were stacked in contact with each other to fabricate an electrode assembly. Herein, the functional layer of the negative electrode was positioned to contact the positive electrode. A lithium secondary cell was fabricated by using the electrode assembly and an electrolyte. The electrolyte was prepared by using a mixed solvent of ethylene carbonate and ethyl methyl carbonate (a volume ratio of 50:50) and dissolving 1 M $LiPF_6$ therein.

Example 3

An anode active material layer was prepared in the same procedure as in Example 1 using the same anode active material slurry.

A composition for an inorganic layer prepared in Example 1 was electrosprayed on the anode active material layer as the same procedure as in Example 1 to form an inorganic layer which was a dense layer, with a thickness of 12 μm. Thereafter, electrospinning was performed using the composition for the organic layer prepared in Example 2 by the same procedure as in Example 2, to form a 8 μm thickness organic layer with a three-dimensional network structure.

According to the process, a negative electrode in which the functional layer of the inorganic layer and the organic layer was integrated with the anode active material layer was prepared.

A cathode was prepared by the same procedure as in Example 1.

The anode and the cathode were stacked in contact with each other to fabricate an electrode assembly. Herein, the functional layer of the anode was positioned to contact the cathode. A lithium secondary cell was fabricated by using the electrode assembly and an electrolyte. The electrolyte was prepared by using a mixed solvent of ethylene carbonate and ethyl methyl carbonate (a volume ratio of 50:50) and dissolving 1 M $LiPF_6$ therein.

Comparative Example 1

An anode active material slurry prepared in Example 1 was coated on a copper current collector and dried followed by pressurizing to prepare an anode.

A cathode was prepared by the same procedure as in Example 1.

A composition for an inorganic layer prepared in Example 1 was coated on a polyethylene substrate (thickness: 12 μm) by a gravure coating procedure to prepare a separator in which inorganic layers with a thickness of 4 μm, based on both sides (sum of thicknesses of both sides) was formed. An acryl/polyvinylidene fluoride binder liquid (solvent: water) was coated on the prepared separator by a gravure coating procedure to prepare a separator in which binder layers with a thickness of 1 μm based on the both sides, was formed.

The anode, the separator (thickness: 17 μm) and the cathode were stacked and compressed at 90° C. at a load of 270 kg for 10 seconds to fabricate an electrode assembly. A lithium secondary cell was fabricated by using the electrode assembly and an electrolyte. The electrolyte was prepared by using a mixed solvent of ethylene carbonate and ethyl methyl carbonate (a volume ratio of 50:50) and dissolving 1 M $LiPF_6$ therein.

Comparative Example 2

An anode active material layer was prepared in the same procedure as in Example 1 using the same anode active material slurry.

A composition for an organic layer prepared in Example 2 was electrospun on the anode active material layer as the same procedure as in Example 1 to form an organic layer with a thickness of 8 μm and having a three-dimensional network structure.

The electrospinning was performed by the following method.

A collector roller and one nozzle pack including 52 tips in which a hole size was 25 G were positioned at a gap of 15 cm, the composition for the organic layer was added to the tip, a voltage of 40 kV to 50 kV was applied, and electrospinning was performed under a condition of 26° C. and relative humidity of 50%. Herein, the speed of a roll of the collector roll was set to be 1 m/min to 3 m/min, and the solid amount in the composition for the organic layer emitted from the tip was set to be 150 μl/min. Furthermore, while compressed air was flowed under a 0.1 MPa pressure, the process was performed.

After completing the electrospinning, drying was performed using hot air of 90° C.

According to the process, an anode in which the functional layer of the organic layer and the inorganic layer was integrated with the anode active material layer was prepared.

A cathode was prepared by the same procedure as in Example 1.

The anode and the cathode were stacked in contact with each other to fabricate an electrode assembly. Herein, the functional layer of the anode was positioned to contact the cathode. A lithium secondary cell was fabricated by using the electrode assembly and an electrolyte. The electrolyte was prepared by using a mixed solvent of ethylene carbonate and ethyl methyl carbonate (a volume ratio of 50:50) and dissolving 1 M $LiPF_6$ therein.

Comparative Example 3

An anode active material slurry prepared in Example 1 was coated on a copper current collector and dried followed by pressurizing to prepare an anode.

A cathode was prepared by the same procedure as in Example 1.

A composition for an inorganic layer prepared in Example 1 was coated on a polyethylene substrate (thickness: 12 μm) by a gravure coating procedure to prepare a separator in which inorganic layers with a thickness of 4 μm, based on both sides (sum of thicknesses of both sides) was formed.

The anode, the separator (thickness: 17 μm) and the cathode were stacked to fabricate an electrode assembly. A lithium secondary cell was fabricated by using the electrode assembly and an electrolyte. The electrolyte was prepared by using a mixed solvent of ethylene carbonate and ethyl methyl carbonate (a volume ratio of 50:50) and dissolving 1 M $LiPF_6$ therein.

Experimental Example 1: Measurement of SEM

Figure 3:
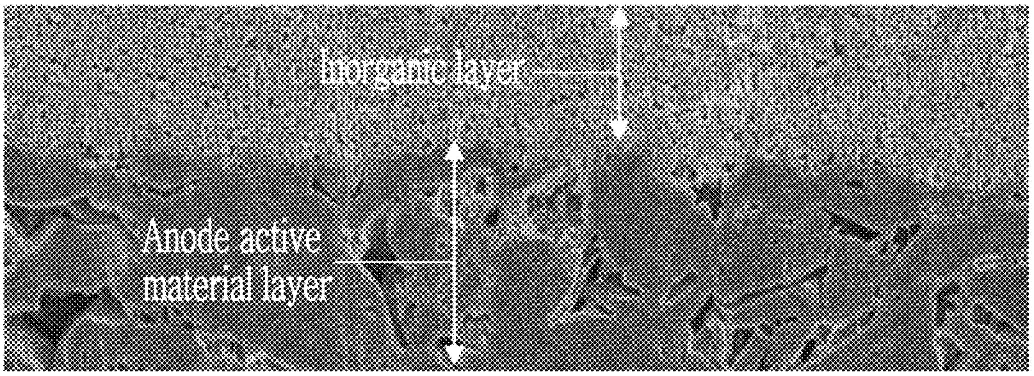
FIG. 3 is a SEM image of a cross-section of the electrode according to Example 1.
Figure 4:
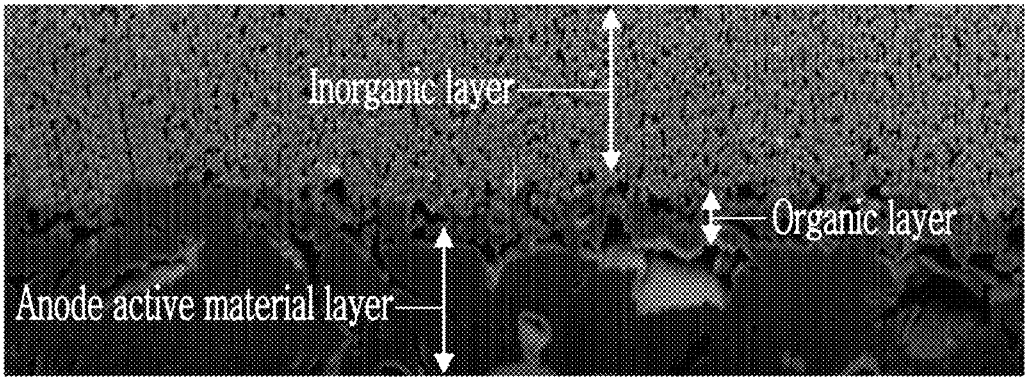
FIG. 4 is a SEM image of a cross-section of the electrode according to Example 2.

Cross-section SEM images for the anodes prepared by Examples 1 and 2 were taken, and the results are shown in FIGS. 3 and 4. Furthermore, cross-section SEM images of the stacked product of the anode of the cell prepared in Comparative Example 1 are shown in FIG. 5.

As shown in FIG. 3 and FIG. 4, the anode according to Example 1 included the functional layer of the inorganic layer, and the anode according to Example 2 included the functional layer of the organic layer and the inorganic layer. In addition, as shown in FIG. 3 and FIG. 4, the interface (boundary plane) of the functional layer and the anode active material layer was not clearly shown to exhibit ruggedness and unevenness. Furthermore, the functional layer was inserted to the curved area of the rugged and uneven surface of the anode active material layer to form, i.e., to form a dense interface, so that pores were substantially and rarely exhibited between the anode active material layer and the functional layer.

In addition, as shown in FIG. 3 and FIG. 4, the inorganic layer was densely prepared.

Figure 5:
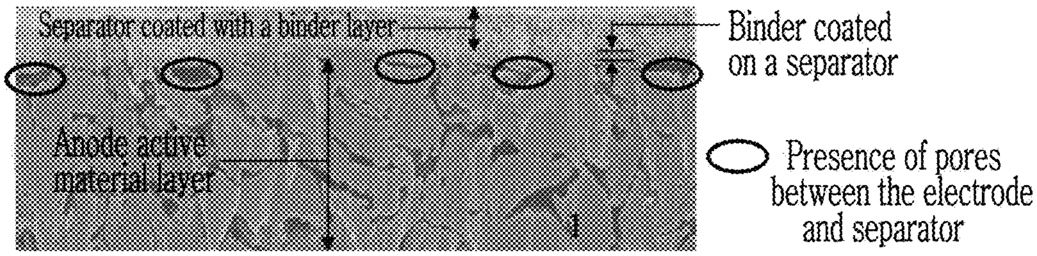
FIG. 5 is a SEM image of a cross-section of the stacked product of the anode and the separator according to Comparative Example 1.

Whereas, as shown in FIG. 5, in case of stacking the anode and the separator, the interface between the anode and the separator was almost flatly formed to clearly distinguish it. This result is as the adherence of the additional separator with the binder layer, i.e., adhesive layer, to the anode causes to not fill the separator to the rugged and uneven surface of the anode active material layer, thereby causing the presence of the area in which the anode active material layer does not contact with the separator in Comparative Example 1. Thus, as shown in FIG. 5, pores are presented between the anode active material layer of the anode and the separator.

Experimental Example 2: Measurement of Peel Strength (Peel Strength (N/m)

The peel strength of the functional layer for the anodes according to Examples 1 to 3 and Comparative Example 2 were measured, and the results are shown in Table 1.

The peel strength measurement was performed by firstly adhering an adhesive tape (Celotape available from 3M Company (trademark) of a width of 1.5 cm to the anode fixed on a stainless steel plate.

Thereafter, a 180° peel strength was tested by using a peeling tester (Manufacturer: KIPAE E&T, Model: KP-M1T-s) under a condition of a 1 kg load cell and a peeling speed of 100 mm/minute to measure a peel strength.

The peel strength test for Comparative Example 1 was performed by stacking the anode and the separator, compressing at 90° C. at a load of 270 kg for 10 seconds, and fixing the adhered product in which the anode and the separator was adhered to measure a peel strength according to the same procedure as the above procedure.

In case of Comparative Example 3, as the anode and the separator were not adhered, and thus, the peel strength could not be measured.

Experimental Example 3: Measurement of Discharge Capacity

The lithium secondary cells of Examples 1 to 3 and Comparative Examples 1 to 3°]] underwent by a formation process including a constant-current charging at a 0.1 C current and a 4.4 V cut-off voltage at 25° C., a constant-voltage until the current reached to 0.025 C while 4.4 V was maintained, and discharging at a 0.1 C constant-current until the voltage reached to 2.75 V.

The cells undergoing the formation process underwent the standard process in which constant current charging was performed at a 0.2 C current, until the voltage reached 4.4 V, constant voltage charging was performed to reach a current to 0.025 C while 4.4 V was maintained, and constant current discharging was performed at a 0.2 C constant current until the voltage reached 2.75 V during discharging. Herein, the discharge capacity was measured, and the results are shown in Table 1.

Experimental Example 4: Evaluation of High-Rate Characteristic

The lithium secondary cells according to Examples 1 to 3 and Comparative Examples 1 to 3 after the formation and the standard process were performed were constant-current charged at 0.2 C to 4.4 V and constant-voltage charged until the current reached 0.025 C, while 4.4 V was maintained. The cells constant-voltage charged were constant-current discharged at 0.2 C, 0.5 C, 1.0 C, and 2.0 C until the voltage reached 2.75 V, and the ratio of discharge capacity at 2.0 C to discharge capacity at 0.2 C discharge was calculated, and then the results are shown in Table 2, as discharge rate capability.

$$\text{Discharge rate-capability (\%)} = (\text{discharge capacity at 2.0 C/discharge capacity at 0.2 C}) \times 100 \quad \text{[Equation 1]}$$

Experimental Example 5: Evaluation of Cycle-Life Characteristic

The lithium secondary cells of Examples 1 to 4 and Comparative Examples 1 to 6 were constant current charged at a 1 C current at 25° C. until the voltage reached 4.4 V and constant current charged while 4.4 V was maintained, until the current reached 0.025 C. Thereafter, the cycles for discharging at a constant current of 1 C until the voltage reached 2.75 V at discharging, were repeated for 300 cycles. A ratio of discharge capacity at the $300^{th}$ cycle to discharge capacity at the $1^{st}$ cycle was calculated by Equation 2, and the results are shown in Table 1, as capacity retention.

$$\text{Capacity retention (\%)} = (\text{discharge capacity at } 300^{th} \text{ cycle/discharge capacity at } 1^{st} \text{ cycle}) \times 100 \quad \text{[Equation 2]}$$

TABLE 1

| | Peel strength (N/m) | Discharge capacity (mAh/g) | Discharge rate-capability (%, 2.0 C/0.2 C) | Capacity retention (%) |
|---|---|---|---|---|
| Example 1 | 0.522 | 187.1 | 89.7 | 80 |
| Example 2 | 0.267 | 187.8 | 90.4 | 88 |
| Example 3 | 0.669 | 187.6 | 90.5 | 87 |
| Comparative Example 1 | 0.146 | 187.6 | 86.2 | 72 |
| Comparative Example 2 | 0.182 | — | — | — |
| Comparative Example 3 | 0.000 | 187.6 | 85.2 | 72 |

As shown in Table 1, in Examples 1 to 4 in which the functional layer with the inorganic layer was included, the functional layer was integrated with the anode active material layer, the additional separator was not included, and the peel strength was 0.2 N/m or more, exhibited suitable discharge capacity, and better high rate-capability and also capacity retention.

Whereas Comparative Example 1 using the general separator exhibited suitable discharge capacity, but had deteriorated discharge rate-capability, and particularly, extremely deteriorated capacity retention.

In addition, in case of Comparative Example 2 including only the functional layer of the organic layer and having the peel strength of less than 0.2 N/m, the functional layer consisting of only organic layer was unable to act as a separator, not driving as a battery, and thus the battery performance tests could not be performed.

Furthermore, Comparative Example 3 including an inorganic layer exhibited suitable discharge capacity, but slightly high rate-capability and extremely deteriorated capacity retention.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. An electrode assembly for a lithium secondary battery, consisting of:

a current collector, an anode active material layer positioned on the current collector, and a functional layer integrated with the anode active material layer; and a cathode, wherein the functional layer comprises at least one inorganic layer, and a peel strength of the functional layer is 0.2 N/m or greater, wherein the interface between the anode active material layer and the functional layer has a dense form without pores.

2. The electrode assembly for a lithium secondary battery of claim 1, wherein the peel strength of the functional layer is 0.2 N/m to 2.0 N/m.

3. The electrode assembly for a lithium secondary battery of claim 1, wherein the inorganic layer is a dense layer.

4. The electrode assembly for a lithium secondary battery of claim 1, wherein the inorganic layer has a thickness of 1 μm to 25 μm.

5. The electrode assembly for a lithium secondary battery of claim 1, wherein the at least one inorganic layer comprises alumina ($Al_2O_3$), boehmite (aluminum oxide hydroxide), zirconia, titania ($TiO_2$), silica ($SiO_2$), or one or more combinations thereof.

6. The electrode assembly for a lithium secondary battery of claim 1, wherein the functional layer comprises at least one organic layer comprising a polymer.

7. The electrode assembly for a lithium secondary battery of claim 6, wherein the organic layer has a three-dimensional network structure.

8. The electrode assembly for a lithium secondary battery of claim 6, wherein the organic layer is positioned to contact the anode active material layer.

9. The electrode assembly for a lithium secondary battery of claim 6, wherein the organic layer comprises polyolefin-based, polyester, polyamide, polyimide, polyamideimide, polyetherimide, polyacrylonitrile, polyvinylidene fluoride, polyvinyl chloride, polyvinylidene chloride, polyethylene glycol derivative, polyoxide, polyvinyl acetate, polystyrene, polyvinylpyrrolidone, a copolymer thereof, or a combination thereof.

10. The electrode assembly for a lithium secondary battery of claim 6, wherein the organic layer has a thickness of 1 μm to 20 μm.

11. The electrode assembly for a lithium secondary battery of claim 1, wherein the functional layer further comprises an organic layer, and the inorganic layer is positioned to contact the anode active material layer.

12. The electrode assembly for a lithium secondary battery of claim 11, wherein the functional layer has a peel strength of 0.2 N/m or greater.

13. The electrode assembly of claim 12, wherein the peel strength of the functional layer is 0.2 N/m to 2.0 N/m.

14. A lithium secondary battery, comprising:

an electrode assembly of claim 1; and an electrolyte.

* * * * *